(12) United States Patent  
Bareket

(10) Patent No.: US 8,794,181 B2
(45) Date of Patent: Aug. 5, 2014

(54) SYSTEM AND METHOD FOR THREE DIMENSIONAL TEAT MODELING FOR USE WITH A MILKING SYSTEM

(75) Inventor: Tal Bareket, Kiryat-Tivon (IL)

(73) Assignee: Mirobot Ltd., Tel-Aviv (IL)

( * ) Notice: Subject to any disclaimer, the term of this patent is extended or adjusted under 35 U.S.C. 154(b) by 0 days.

(21) Appl. No.: 14/004,706

(22) PCT Filed: Mar. 14, 2012

(86) PCT No.: PCT/IL2012/050092
§ 371 (c)(1),
(2), (4) Date: Sep. 12, 2013

(87) PCT Pub. No.: WO2012/123948
PCT Pub. Date: Sep. 20, 2012

(65) Prior Publication Data
US 2014/0000520 A1 Jan. 2, 2014

Related U.S. Application Data

(60) Provisional application No. 61/453,588, filed on Mar. 17, 2011, provisional application No. 61/453,592, filed on Mar. 17, 2011.

(51) Int. Cl.
*A01J 7/04* (2006.01)
(52) U.S. Cl.
USPC .................................... 119/14.02; 119/14.08
(58) Field of Classification Search
USPC ................................. 119/14.02, 14.08, 14.18
See application file for complete search history.

(56) References Cited

U.S. PATENT DOCUMENTS

| 5,379,721 A | 1/1995 | Dessing et al. |
| 5,697,324 A | 12/1997 | Van der Lely |
| 6,009,833 A | 1/2000 | Van der Lely |
| 6,227,142 B1 | 5/2001 | Birk |

(Continued)

FOREIGN PATENT DOCUMENTS

| EP | 2060173 | 5/2009 |
| NL | 9100870 | 12/1992 |

(Continued)

OTHER PUBLICATIONS

International Preliminary Report on Patentability Dated May 17, 2013 From the International Preliminary Examining Authority Re. Application No. PCT/IL2012/050092.

(Continued)

*Primary Examiner* — Yvonne Abbott

(57) ABSTRACT

A teat modeling device includes a housing with an illumination unit operative to project a structured light pattern on at least one teat of a dairy animal and a camera axially aligned with the illumination unit and positioned between the illumination unit and the at least one teat of the dairy animal, wherein the camera is operative to capture images of the structured light pattern reflected off the at least one teat. A teat modeling device further includes a memory unit storing expected shape parameters of the at least one teat based on a pre-defined shape of the at least one teat and a processor operative to compute a three dimensional model of the at least one teat based on the stored parameters, positioning of the reflected pattern on the image and spacing between elements of the reflected pattern.

30 Claims, 11 Drawing Sheets

(56) References Cited

U.S. PATENT DOCUMENTS

| | | | |
|---|---|---|---|
| 7,044,079 B2 | 5/2006 | Deelstra | |
| 7,231,886 B2 | 6/2007 | Van den Berg et al. | |
| 7,246,571 B2 | 7/2007 | Van den Berg et al. | |
| 7,377,232 B2 | 5/2008 | Holmgren et al. | |
| 7,444,961 B1 * | 11/2008 | Ellis | 119/842 |
| 7,447,558 B2 * | 11/2008 | Pratt | 700/118 |
| 7,490,576 B2 | 2/2009 | Metcalfe et al. | |
| 7,559,289 B2 | 7/2009 | Van Liere | |
| 7,568,447 B2 | 8/2009 | Peacock | |
| 7,614,361 B2 | 11/2009 | Van den Berg et al. | |
| 7,726,257 B2 | 6/2010 | Fransen | |
| 7,961,934 B2 * | 6/2011 | Thrun et al. | 382/154 |
| 8,210,122 B2 * | 7/2012 | Pettersson et al. | 119/14.08 |
| 2002/0033138 A1 | 3/2002 | Brayer | |
| 2002/0152963 A1 | 10/2002 | Vijverberg | |
| 2004/0216679 A1 | 11/2004 | Ealy et al. | |
| 2006/0196432 A1 | 9/2006 | Peacock | |
| 2007/0215052 A1 | 9/2007 | Metcalfe et al. | |
| 2008/0314324 A1 | 12/2008 | Pettersson et al. | |
| 2010/0017035 A1 | 1/2010 | Van den Berg | |
| 2010/0031889 A1 | 2/2010 | Eriksson et al. | |
| 2010/0186675 A1 | 7/2010 | Van den Berg | |
| 2010/0192862 A1 | 8/2010 | Van den Berg | |
| 2010/0199915 A1 | 8/2010 | Pettersson et al. | |
| 2013/0340682 A1 | 12/2013 | Bareket | |

FOREIGN PATENT DOCUMENTS

| | | |
|---|---|---|
| WO | WO 97/15900 | 5/1997 |
| WO | WO 98/44782 | 10/1998 |
| WO | WO 99/30277 | 6/1999 |
| WO | WO 2009/093965 | 7/2009 |
| WO | WO 2010/023122 | 3/2010 |
| WO | WO 2012/123944 | 9/2012 |
| WO | WO 2012/123948 | 9/2012 |

OTHER PUBLICATIONS

International Search Report and the Written Opinion Dated Jul. 25, 2012 From the International Searching Authority Re. Application No. PCT/IL2012/050092.

International Search Report and the Written Opinion Dated Jul. 26, 2012 From the International Searching Authority Re. Application No. PCT/IL2012/050088.

Second Written Opinion Dated Mar. 12, 2013 From the International Preliminary Examining Authority Re. Application No. PCT/IL2012/050092.

International Preliminary Report on Patentability Dated Sep. 26, 2013 From the International Bureau of WIPO Re. Application No. PCT/IL2012/050088.

* cited by examiner

SYSTEM AND METHOD FOR THREE DIMENSIONAL TEAT MODELING FOR USE WITH A MILKING SYSTEM

RELATED APPLICATIONS

This application is a National Phase of PCT Patent Application No. PCT/IL2012/050092 having International filing date of Mar. 14, 2012, which claims the benefit of priority under 35 USC §119(e) of U.S. Provisional Patent Application Nos. 61/453,588 filed Mar. 17, 2011 and 61/453,592 also filed Mar. 17, 2011. The contents of the above applications are all incorporated herein by reference.

PCT Patent Application No. PCT/IL2012/050088 having International filing date of Mar. 14, 2012, entitled "Human Assisted Milking Robot and Method" and claiming priority from U.S. Provisional Patent Application No. 61/453,592 filed Mar. 17, 2011 and U.S. Provisional Patent Application No. 61/453,588 also filed Mar. 17, 2011, describes apparatus and methods related to the present invention which was invented by the present inventor and which is incorporated by reference as if fully set forth herein.

FIELD OF THE INVENTION

The present invention, in some embodiments thereof, relates to robotic milking systems and more particularly, but not exclusively, to teat location units for use with a robotic milking system.

BACKGROUND OF THE INVENTION

To alleviate the labor involved in milking, much of the milking process has been automated. Known milking machines have automated milk extraction and automatic cluster removal is available to remove milking equipment after milking. To fully automate the milking process, robotic milking systems have been developed. Typically, robotic milking machines aim to perform the tasks of recognizing and locating the cow teats; attaching the teat cups; together with, cleaning, pre-milking, milking and disinfecting the udder and teats of the cow. Due to the working environment and the wide variation in teat size, shape and orientation, the step of locating the teats has proved difficult. Inherent movement of the cow also lends to the difficulty in teat locating. As such, a variety of systems and methods have been attempted for locating the cow teats in robotic milking systems. Success rate of these system are typically dependent on the achievable accuracy and report rate as well as the bill of materials.

U.S. Pat. No. 6,227,142 entitled "Apparatus and Method for Recognizing and Determining the Position of a Part of an Animal," the contents of which is incorporated herein by reference, describes capturing an image of an area illuminated with structured light, processing the image to identify a specific part of the animal, determining position of the animal part in three dimensions, and providing information for guiding an animal related device towards the determined position. Position of a single teat is determined by illuminating an identified teat with at least two projected lines, capturing an image of the lines and calculating a mean value of positions of the lines on the image. Optionally the line is a line of dots. Typically, the illumination is directed at an angle perpendicular to a longitudinal axis of a teat while the camera is positioned at an angle. The disclosure is specifically toward determining a single point position of a single animal part (a teat) per camera and does not provide three dimensional (3D) information regarding an orientation of the animal part.

U.S. Pat. No. 7,490,576 entitled "Time of Flight Teat Location System," the contents of which is incorporated herein by reference, describes a teat location system for automated milking systems. The system has a light projection source and a special camera having a two dimensional array of pixels, each of which is capable of returning time of flight information as well as intensity to obtain 3D positioning of the teat.

U.S. Pat. No. 7,568,447 entitled "Improvements in or Related to Milking Machines," the contents of which is incorporated herein by reference, describes a teat locating sensor for use in robotic milking machines and teat disinfection units. The captured image is processed by applying an edge detector to provide an edge image of the udder. A Hough transform is applied for detecting edges using semi-circles and near vertical forms. A feature detector then matches these to provide teat ends and teat sides and thus produces a teat location map. At least two cameras are required for locating the teats in 3D.

US Patent Application Publication No. US 2010/0186675 entitled "Implement for Automatically Milking a Dairy Animal," the contents of which is incorporated herein by reference, describes an implement for automatically milking a dairy animal that includes a milking parlor, a sensor for observing a teat, and a milking robot for automatically attaching a teat cup to the teat. The sensor comprises a radiation source for emitting light, a receiver for receiving electromagnetic radiation reflected from the dairy animal, a lens, and sensor control unit. The sensor includes a matrix with a plurality of rows and a plurality of columns of receivers. The sensor control unit is designed to determine for each of the receivers a phase difference between the emitted and the reflected electromagnetic radiation in order to calculate the distance from the sensor to a plurality of points on the part to be observed of the dairy animal.

SUMMARY OF THE INVENTION

According to an aspect of some embodiments of the present invention there is provided a system and method for identifying and modeling one or more teats of an udder in three dimensions (3D) based on a two dimensional (2D) image of a pattern that is projected on the teat(s). In some exemplary embodiments, one or more teats defining a region of interest and/or all the teats of an udder are modeled based on an image of the teats captured by a single camera, e.g. a single image. According to some embodiments of the present invention, the system and method provides fast rate identification and modeling that can be used by a motion control unit of a robotic milking machine to control movement of robotic arm for attaching teat cups of a milking device and for cleaning and/or disinfecting the teats. According to some embodiments of the present invention, the system and method provides information regarding both the location and the orientation of each teat in 3D.

The present inventor has found that many of the failures associated with automated attachment of the teat cups result from insufficient information regarding 3D orientation of the teats. According to some embodiments of the present invention, the systems and methods described herein identify both 3D orientation and 3D location of each of one or more teats of an udder and apply that information to guide automated attachment of teat cups to the teats. An aspect of some embodiments of the present invention provides for a method for three dimensional modeling of teats of a dairy animal, the method comprising: illuminating at least one teat of a dairy animal with a structured light pattern; capturing an image of the structured light pattern reflected from the at least one teat;

determining positioning of the reflected pattern on the image; determining spacing between elements of the reflected pattern; and computing a three dimensional model of the at least one teat based on the determined positioning and the determined spacing, wherein a shape of the three dimensional model is pre-defined.

Optionally, the pre-defined shape of the at least one teat is a cylindrical shape.

Optionally, the at least one teat is illuminated with a matrix pattern formed from a plurality of illumination spots.

Optionally, the method comprises determining three dimensional coordinates of spots reflected off the at least one teat.

Optionally, a coordinate value along an axis perpendicular to the image plane is computed from the determined spacing between the spots reflected off the at least one teat.

Optionally, the method comprises identifying a pair of spots defining a line that is perpendicular to the image plane, and computing a coordinate value along an axis perpendicular to the image plane from determined spacing between pair of spots.

Optionally, the method comprises determining at least one of intensity and size of the spots reflected off the at least one teat.

Optionally, a coordinate value along an axis perpendicular to the image plane is computed from at least one of the determined intensity and the determined size of the spots.

Optionally, the three dimensional model of the at least one teat is computed from a single image.

Optionally, the method comprises modeling both an illuminated portion of the at least one teat and a portion of the at least one teat opposite the illuminated portion.

Optionally, the portion opposite the illuminated portion is modeled as a replica of the illuminated portion of the at least one teat.

Optionally, the three dimensional model determines three dimensional orientations of the at least one teat.

Optionally, the method comprises updating the three dimensional model at a rate of 2-20 Hz.

Optionally, the method comprises simultaneously illuminating all the teats of the dairy animal with the structured light.

Optionally, an image of all the teats of the dairy animal is captured in a single image.

Optionally, the method includes performing segmentation on the image to identify the structured light pattern reflected off each of the teats.

Optionally, the segmentation is based on the determined spacing between elements of the structured pattern.

Optionally, the method includes computing a three dimensional model for all the teats based on the single image.

An aspect of some embodiments of the present invention provides for a teat modeling device comprising: a housing including: an illumination unit adapted to project a structured light pattern on at least one teat of a dairy animal; and a camera axially aligned with the illumination unit and positioned between the illumination unit and the at least one teat of the dairy animal, wherein the camera is adapted to capture images of the structured light pattern reflected off the at least one teat; a memory unit storing expected shape parameters of the at least one teat based on a pre-defined shape of the at least one teat; and a processor adapted to compute a three dimensional model of the at least one teat based on the stored parameters, positioning of the reflected pattern on the image and spacing between elements of the reflected pattern.

Optionally, the pre-defined shape is a cylindrical shape.

Optionally, an illumination unit is adapted to project dot matrix pattern on the at least one teat of the dairy animal.

Optionally, the processor is adapted to determine three dimensional coordinates of elements of the reflected pattern reflected off the at least one teat.

Optionally, the processor is adapted to determine coordinate value along an axis perpendicular to the image plane from measured spacing between contiguous elements of the reflected pattern reflected off the at least one teat.

Optionally, the processor is adapted to identify a pair of elements of the reflected pattern defining a line that is perpendicular to the image plane and to determine a coordinate value along an axis perpendicular to the image plane from determined spacing between the pair of elements of the reflected pattern.

Optionally, the processor is adapted to determine at least one of intensity and size of the elements of the reflected patterns.

Optionally, the processor is adapted to defined the three dimensional model of the at least one teat from a single image captured by the camera.

Optionally, the processor is adapted to determine three dimensional orientations of the at least one teat.

Optionally, the processor is adapted to model both an illuminated portion of the at least one teat and a portion of the at least one teat opposite the illuminated portion.

Optionally, the processor defines the three dimensional model of the at least one teat based on the assumption that the at least one teat is a cylindrical shaped structure.

Optionally, the processor is adapted to update the three dimensional model at a rate of 2-20 Hz.

Optionally, the illumination unit is adapted to simultaneously illuminate all the teats of a dairy animal with the structured light pattern.

Optionally, the illumination unit includes an array of LEDs.

Optionally, the illumination unit includes a diffraction grating adapted to form the structured light.

Optionally, the illumination unit provides pulsed illumination.

Optionally, the illumination unit includes an image projector.

Optionally, the camera is adapted to capture all the teats of the dairy animal in a single image.

Optionally, the processor is operative to perform segmentation on the image to identify the structured light pattern reflected off each of the teats.

Optionally, the processor is operative to compute a three dimensional model of all the teats captured in the single image.

Optionally, the device includes a controller adapted to transmit commands to a motion control unit of a robotic milking system for interacting with the at least one teat.

Optionally, the camera is operative to capture an image of at least one teat cup and the processor is operative to detect a position of the at least one teat cup.

An aspect of some embodiments of the present invention provides for a robotic milking system comprising: a teat modeling unit; a motion control unit; and at least one robotic arm for manipulating a milking device, wherein the motion control unit controls movement of the at least one robotic arm based on input from the teat modeling unit.

Optionally, the milking device includes at least one teat cup patterned with at least one of a reflector and a LED.

Optionally, the teat modeling unit is operative to track a position of the at least one teat cup.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
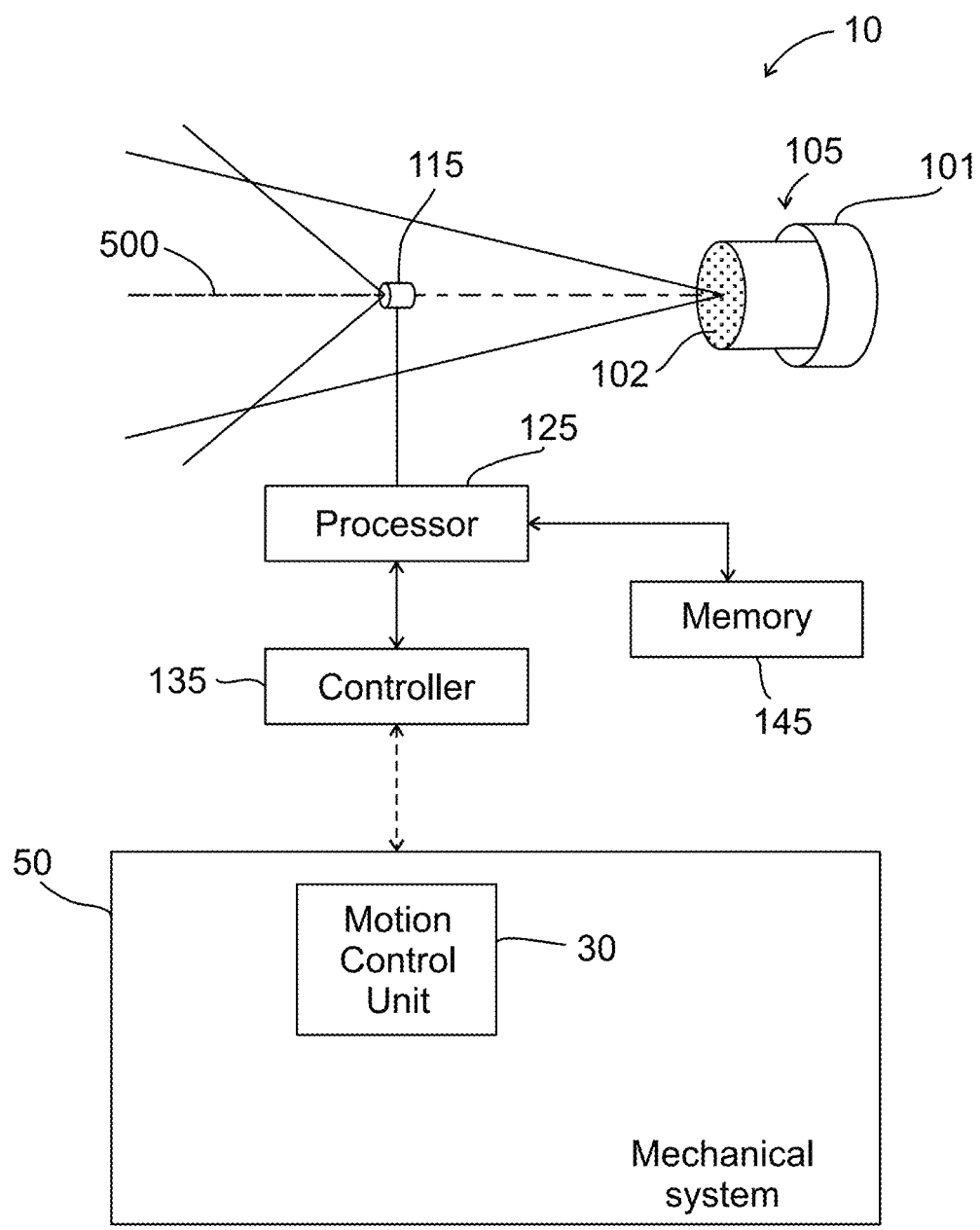
FIG. 1A is a simplified block diagram of an exemplary teat modeling device in accordance with some embodiments of the present invention.

The present invention, in some embodiments thereof, relates to robotic milking systems and more particularly, but not exclusively, to teat location units for use with a robotic milking system.

According to some embodiments of the present invention, a teat modeling device includes an illumination unit for illuminating an area including the teats, a camera for capturing images of the illuminated area, a processor adapted to model the teats in 3D based on captured image data and a controller for controlling operation and communicating information to and from a motion control unit of a robotic milking machine. According to some embodiments of the present invention, the illumination unit projects a spatial pattern of illumination, e.g. a dot matrix pattern toward an area including the teats and a camera captures images of the illumination pattern reflected off the teats. Optionally, the pattern is composed of spots having a defined shape, e.g. rectangular, star shaped, or oval shaped that can be clearly distinguished from artifacts or other captured objects. According to some embodiments of the present invention, the camera and the illumination unit are displaced at a pre-defined distance from each other along a line a sight of the illumination unit. Optionally, when the illumination pattern is provided with collimated light, the illumination unit and camera are not required to be distanced from each other. According to some embodiments of the present invention, position of the imaged spots (or dots) in the 2D image plane and spacing between imaged spots are calculated and used to identify and model a structure of each teat in 3D. Optionally, size and intensity of the imaged spots are also used to identify and model a structure of each teat in 3D. Typically, modeling a structure of each teat in 3D includes determining position and orientation of each teat in 3D. Optionally, modeling a structure of each teat in 3D includes determining dimensions or extent of each teat in 3D. According to some embodiments of the present invention, the structure of each of the teats is modeled in 3D based on information obtained from a single image of the teats.

Typically, the size of the pattern as captured by the camera is a function of a distance between the illuminated teat and the camera, as well as a function of an angle of illumination of the illumination unit and a FOV of the camera. According to some embodiments of the present invention, the FOV of the camera is selected to be larger than an illumination angle of the illumination unit, e.g. the FOV of the camera is between 75-120 degrees. Optionally, the illumination angle is selected to be relatively narrow as compared to the FOV of the camera, e.g. 25-35 degree angle. The present inventor has found that when selecting an angular FOV of the camera that is larger than an angle of illumination of illumination unit, the size of the pattern (and the distances between spots) as captured by the camera decreases as the teats are distanced from the camera although the spacing between the spots actually projected on the teats increases. An advantage of using a relatively wide camera FOV and relatively narrow illumination angle is that a relatively narrow angle of illumination provides for illuminating each teat with a plurality of spots, while a relatively wide camera FOV provides for capturing all the teats in a single image from a relatively close range. According to some embodiments of the present invention, a function relating pattern size determined from captured images of the pattern reflected off the teats to distance from the camera is defined based on known properties of the camera and illumination unit.

In some exemplary embodiments, a model of the teats is determined for each image captured. Optionally, some of the captured frames that do not meet specified criteria are not used for modeling, e.g. frames captured while the cow is moving. The present inventor has found that a model update rate of at least 2 FPS, e.g. 8-10 Frames Per Second (FPS) is typically required to take into account position changes of the teats due to movement of the cow.

According to some embodiments of the present invention, a processor receives output from the camera, identifies the illumination pattern projected by the illumination unit and captured by the camera and analyzes parameters of the illumination pattern to identify and model the teats in 3D.

According to some embodiments of the present invention, the processor determines 2D positions of the illumination spots in the image and also determines distance of the teats from the camera at selected spots on the teat based on measured spacing between selected pairs of contiguous spots. Typically, 2D positions of the illumination spots in the image provide information regarding position and shape of the teats in the image plane, and the distances determined at the selected points provide information regarding position and shape of the teats in a plane perpendicular to the image plane. Typically, determined distances of the teats from the camera at selected points are also used to transform determined 2D positioning of the illumination spots on the image to 2D coordinates in space, e.g. in global coordinates.

According to some embodiments of the present invention, identification and modeling of the teats is based on an assumption that the teats are generally of a cylindrical shape and that they are generally symmetric along their longitudinal axis. The present inventor has found that due to the cylindrical shape of the teats, a full 3D model of the teats can be constructed even though only a portion of each teat surface, e.g. on side of each teat is illuminated and imaged in the captured image. Typically, the hidden side of the teat, e.g. the side of the teat and/or the portion of the teat surface that is opposite the imaged side or portion is modeled as a replica of the imaged side of the teats. Modeling the teats from image data obtained by a single camera and from a single image significantly simplifies computation required and quickens the identification and modeling procedure.

The present inventor has also found that by assuming a cylindrical shape of the teats, distance of the teats from the camera based on measured spacing between selected pairs of contiguous spots is only required to be made for a single array of spots extending along a length of each teat. Based on the assumed cylindrical structure, 3D coordinates of spots distanced from the single array can then be inferred based on their distance from the array of spots. Optionally, the single array of spots extending along a length of each teat selected is the array associated with the brightest spots, e.g. the array closest to the camera. Optionally, the single array of spots chosen is the longest array in the captured pattern and/or the array that is position closest to the central axis of the captured pattern for each teat.

In some exemplary embodiments an assumption is also made that the length and/or diameter of the teats are within known limits. This assumption may be used to differentiate the teat from a leg and/or tail of the animal or an object positioned in the FOV of the camera. Optionally, an additional assumption is made that the orientation of the teats is within known limits. In some exemplary embodiments, it is assumed that the number of teats in the udder is known. Optionally, a range in the number of teats is assumed and irregularities are accounted for, e.g. additional teats that are irregular are identified but not selected for milking.

The present inventor has also found that typically the area around the teats is typically clear from any obstructing surfaces that will reflect illumination generally directed toward the teats. As such, most of the illumination captured by the camera is reflected off the teats and the teat areas can be readily identified. Optionally, if less than all the teats are identified, the camera and illumination unit are maneuvered (by a robotic arm of the milking system) to new positions until a proper view of all the teats can be obtain. Optionally, a full 3D model of the teats is only computed after all the teats of interest are identified. In some exemplary embodiments, a robotic system includes more than one teat modeling unit. In some exemplary embodiments, two or more teat modeling units are operated substantially simultaneously to capture images of all the teats and provide models of all the teats. Optionally, one teat modeling unit is operated to model a portion of the teats, e.g. two teats that are visible from one FOV and another teat modeling unit is operated to model the remaining teats that are visible from another FOV. Optionally, one or more teat modeling units having the best view of the teats are selected from the plurality of the teat modeling units available in the milking robot to be used to model the teats. Optionally, when a milking robot includes a plurality of teat modeling units, the units are stationary on a robotic platform.

Reference is now made to FIG. 1A showing a simplified block diagram of an exemplary teat modeling device in accordance with some embodiments of the present invention. According to some embodiments of the present invention, teat modeling device 10 includes an illumination unit 105 providing structured light to illuminate an area of the teats, an imaging unit 115 that is axially aligned (axis 500) with illumination unit for capturing images of the illuminated teats, a processor 125 and associated memory unit 145 for processing and optionally storing image data received from imaging unit 115 and a controller 135. Typically, controller 135 controls communication with other units of mechanical system 50, e.g. motion control unit 30 and generally controls operation of the teat modeling device. Optionally, controller 135 and motion control unit 30 is integrated into a single unit.

According to some embodiments of the present invention, illumination unit 105 includes an illumination source or projector 101 and an optical element 102 that together provide a structured light pattern. According to some embodiments of the present invention illumination unit 150 provides illumination with illuminating angle of between 25-35 degrees, e.g. 30 degrees and covers an area large enough to simultaneously illuminate all the teats of a dairy animal, e.g. cover a surface area of 0.1 $m^2$. Optionally, illumination unit is shaped to provide elongated shaped illumination, e.g. rectangular or elliptical or other shape that matches an area of the teats.

According to some embodiments of the present invention, illumination unit 105 illuminates at a Near InfraRed (NIR), e.g. 850 nm and at a relatively high intensity as compared to expected background illumination so that the structured light can be differentiated from background noise (due to sunlight or artificial lighting provided in the milking parlor). Optionally, filtering is used to block undesired wavelengths. Illuminating at a near infrared range may be advantageous because it can typically be sensed by most off-the shelf (and low cost) image sensors. Typically, noise in the IR range due to indirect sunlight or other visible light out of the image can be filtered out. Optionally, other wavelengths that can be differentiated from sunlight or artificial light used in the milking parlor can be used. In some exemplary embodiments, the illumination unit provides illumination at around 10,000 lux so that the structured pattern can be easily identified in the captured images of the teats. Optionally, the illumination is flashed or pulsed in coordination with image capturing, e.g. prior to capturing an image.

In some exemplary embodiments, projector 101 includes an array of LEDs and optical element 102 includes a cover that is perforated with a desired pattern for the structured light. Optionally and alternatively, projector 101 includes a laser diode and optical element 102 includes a diffraction grading for diffracting the light from the laser diode into a plurality of beams forming the structured light. Optionally, projector 101 is an image projector, e.g. such as a 3M™ micro projector and a desired matrix pattern is displayed on an image to be projected by projector 101. Optionally, projector 101 projects collimated light. It will be appreciated that illumination unit 105 may include additional elements, e.g. additional optical elements which are not shown for clarity.

According to some embodiments of the present invention, the structured light pattern provided by illumination unit 105 is a matrix pattern of spots that is typically dense enough to illuminate each teat with a plurality of spots. Typically the spots are round dots, although other shapes, e.g. squares, rectangles, lines can be used to provide the matrix pattern. Optionally, the pattern is symmetric along the column and row direction of the matrix. In some exemplary embodiments, the spots are spaced so that at least 3-5 spots are projected across the teats, e.g. along a direction generally perpendicular to a longitudinal axis of the teats, a generally horizontal direction and/or along a row direction of the matrix pattern. In some exemplary embodiments, the spots in each row and column are spaced at about 0.5 degrees and/or between 0.3 to 0.5 degrees.

According to some embodiments of the present invention, imaging unit 115 is a digital camera with a frame rate of 2-30 FPS, e.g. 10 FPS. In some exemplary embodiments, the Field Of View (FOV) of imaging unit 115 is relatively wide, e.g. between 75 to 120 degrees and/or wide enough so that all the teats of the dairy animal to be modeled can be captured in a single image from a relatively close distance, e.g. 5-60 cm distance. Optionally, a region of interest includes less than all the teats, and the FOV of imaging unit 115 is adjusted to cover substantially only the region of interest.

Optionally and typically, the digital camera includes an off-the-shelf image sensor such as MT9V032C12STM image sensor offered by Aptina™ or the like. In some exemplary embodiments, an IR blocking filter that may typically be used with off-the-shelf image sensors is removed and replaced with a visually opaque filter that passes NIR illumination. Optionally, the filter blocks wavelengths below 850 nm. Typically, imaging unit 115 picks up illumination having intensities 0.5-1 lux or more per pixel so that the matrix pattern can be easily identified. In some exemplary embodiments, image unit 115 is operated with short exposure periods, e.g. 1-10 msec to reduce effect of background noise that is typically lower in intensity. According to some embodiments of the present invention, filtering and/or short exposure periods provide for capturing images with imaging unit 115 that mostly include the reflected illumination pattern (reflected off the dairy animal). Optionally, longer exposure periods are periodically used to capture a full image of the teats showing details other than the patterned illumination.

According to some embodiments of the present invention, illumination unit 105 and imaging unit or camera 115 are aligned along a same axis so that both the camera and the illumination unit have a same line of sight and displaced from each other along the axis at a defined distance, e.g. 10-50 cm. According to some embodiments of the present invention, the camera is positioned in front of the illumination unit, e.g. between the illumination unit and the teats at a pre-defined distance 'D' from the illumination unit. Optionally, when the illumination pattern is provided with collimated light, a predetermined distance between the illumination unit and camera is not required.

According to some embodiments of the present invention, the FOV of camera 115 is larger than the illumination angle of illumination unit 105. Typically, camera 115 is positioned between the illumination unit and teats at a defined distance from the illumination unit. Typically, illumination unit 105 and camera 115 are housed in a common housing so that the defined distance between them is maintained during operation and movement of the teat modeling device 10. Typically, the size of camera 115 is significantly smaller than the area illuminated by illumination unit 105 so that only a small portion of the illumination is blocked by camera 115. Optionally, a blocked portion of the illumination is directed away from a region of interest, e.g. between the teats, above the teats, or below the teats. Typically, during operation, the line of sight of teat modeling device, e.g. the camera together with the illumination unit is aligned to be parallel to a platform on which the dairy animal is standing, at a height of the teats and at a distance of 10-60 cm from the expected location of the teats. Optionally, the line of sight of teat modeling device is positioned at an angle to the platform on which the dairy animal is standing.

According to some embodiments of the present invention, a processor 125 builds a 3D model of the image teats based image data and data and/or parameters stored in memory 145. Typically, processor 125 performs image processing on image data to remove known distortions, e.g. barrel distortion in captured pattern. Typically the 3D model provides 3D information regarding positioning, structure and orientation of each of the teats. Optionally, the processing unit may also model and/or provide information regarding the udder, e.g. the size of the udder.

According to some embodiments of the present invention, controller 135 controls operation and communication with teat modeling device including coordinating operation between illumination unit 105 and imaging unit 115. Typically, controller 135 transmits commands to a motion control unit 30 to move one or more robotic arms and/or the robotic platform to a defined position and at a defined orientation, e.g. for attaching a milking cluster. Optionally, controller 135 controls communication between teat modeling device 10 and remote systems, e.g. herd management system and a human operated control unit. Optionally, controller 135 controls communication between a herd management system and the robotic milking system. For example, a herd management system can be used to control movement of the dairy animals in and out of the milking parlor, can identify dairy animal from the milking parlor and communication information to controller 135 that can be used to model the teats. Optionally, dairy animal identification, milking history or other parameters stored in herd management system is communicated via controller 135 and used by the teat modeling device 10 to model teats of a dairy animal.

Figure 1B:
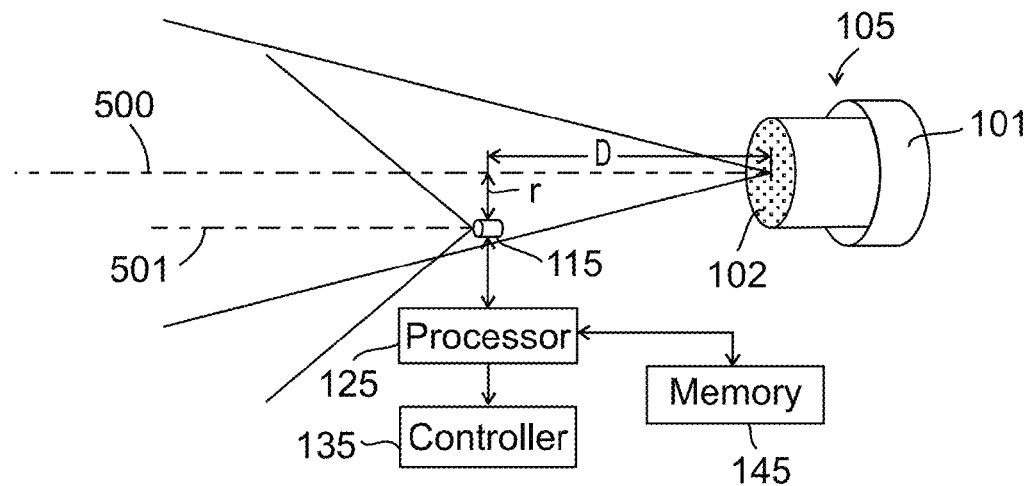
FIGS. 1B-1C are simplified block diagrams of an exemplary teat modeling units with alternate optical designs in accordance with some embodiments of the present invention.
Figure 1C:
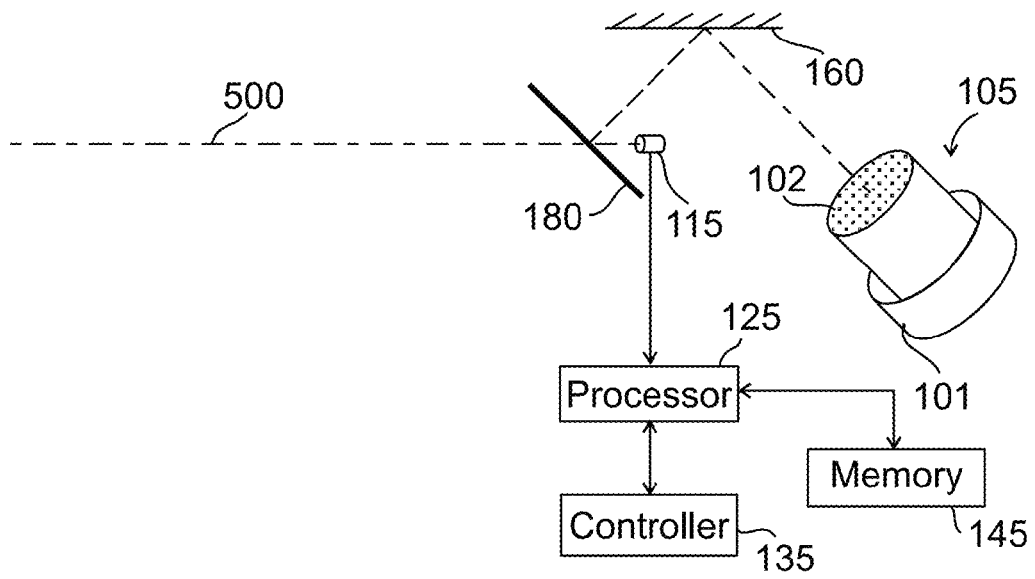

Reference is now made to FIGS. 1B-1C showing alternate exemplary optical designs for a teat modeling device in accordance with some embodiments of the present invention. In some exemplary embodiments, position of an imaging unit 115 with respect to an illumination unit 105 is manipulated to avoid and/or reduce shadowing due to the presence of imaging unit 115 within the illumination angle of illuminating unit 105.

Referring now to FIG. 1B, in some exemplary embodiments, imaging unit 115 of a teat modeling unit is distanced from illuminating unit 105 along line of sight 500 by a distance 'D' and is also is displaced from a line of sight 500 of illumination unit 105 by distance 'r'. Optionally, imaging unit 115 is displaced from line of sight 500 to a position that will generally not obstruct illumination in an area directed toward the teats, e.g. will not cast a shadow on the teats. Optionally, imaging unit 115 is positioned to cast a shadow above or below an expected area of the teats. Typically, the line of sight 501 of imaging unit 115 is at least parallel to the line of sight 500 of illumination unit 105.

In some exemplary embodiments, processor 125 is operable to track a position of a shadow formed by imaging unit 115 and a position of the teat modeling unit is adjusted to position the shadow between and/or away from the teats. Typically, position adjustment of teat modeling unit is controlled by controller 135.

Referring now to FIG. 1C, in some exemplary embodiments, obstruction due to imaging unit 115 is avoided by illuminating through a beam splitter 180. In some exemplary embodiments, illumination from illuminating unit 105 is directed toward a reflecting surface 160, e.g. a minor and through a beam splitter 180, while imaging unit 115 is aligned with line of sight 500. Optionally, in such a case, an effective distance 'D' is determined by a difference between an overall length of the light path between illumination unit 105 and the teats as compared to the length of the light path between the teats and imaging unit 115. In some exemplary embodiments, beam splitter 180 is replaced with a mirror having a hole aligned with line of sight 500 of imaging unit 115. Optionally, the hole has same dimensions as optical lens associated with imaging unit 115.

Figure 2:
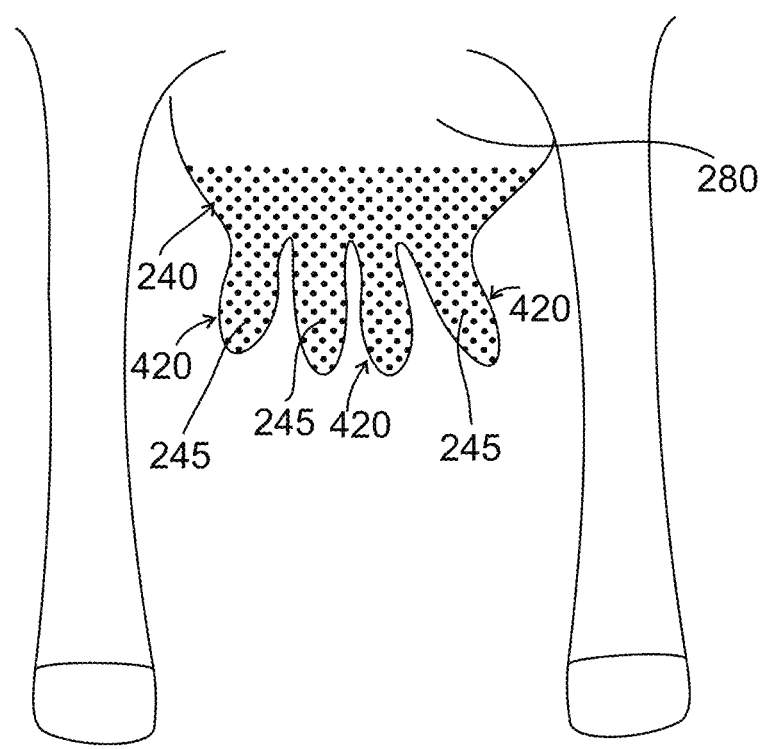
FIG. 2 is a simplified schematic drawing of an exemplary illumination pattern illuminating teats of a dairy animal in accordance with some embodiments of the present invention.

Reference is now made to FIG. 2 showing a simplified schematic drawing of an exemplary illumination pattern illuminating teats of a dairy animal in accordance with some embodiments of the present invention. According to some embodiments of the present invention, illumination unit is positioned at a defined range of distances from the teats, e.g. 15-120 cm from the teats and provides a pattern 240 that is dense enough to illuminate each of teats 420, e.g. each of the teats within the region of interest, with a plurality of spots 245, e.g. a plurality of rows and columns of illumination spots. In some exemplary embodiments, each teat is illuminated with a pattern including at least 3 rows and 2 columns. Optionally, at least part of udder 280 is also illuminated with the illumination pattern. It is noted that although the pattern in FIG. 2 is shown as symmetrical for simplicity sake, the 3D structure of udder 280 and teats 420 typically distort the symmetry of the illuminated pattern. Additionally, the pattern captured typically includes distortions due to optics, e.g. barrel distortion. Typically, size, intensity, and alignment of spots 245 as well as the proximity between contiguous spots 245 are altered over the surface of teats 420 and udder 280 due to the varying distances from which spots 245 are reflected. According to some embodiments of the present invention, 3D coordinates of each spot 245 projected on the teat (or a selected portion of the dots) is determined based on analysis of reflected illumination pattern and a surface function (or model) of the illuminated part of the teat is defined based on the determined coordinates.

Figure 3:
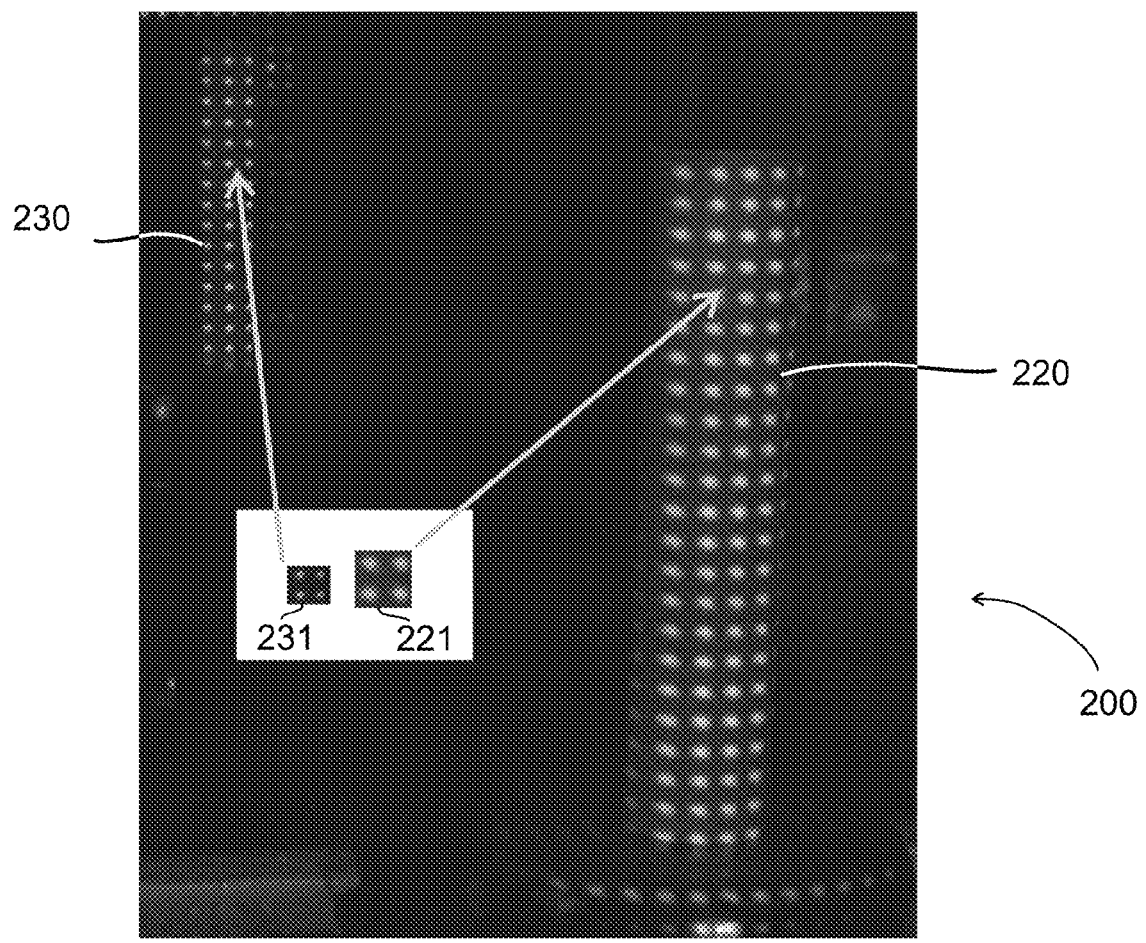
FIG. 3 is an exemplary image showing an exemplary illumination pattern reflected off two cylinders positioned at different distances from a camera in accordance with some embodiments of the present invention.

Reference is now made to FIG. 3 showing an exemplary image with an exemplary illumination pattern reflected off two cylinders positioned at different distances from a camera in accordance with some embodiments of the present invention. In some exemplary embodiments, image 200 of an illumination pattern reflected off two cylinders 220 and 230 positioned at different distances from a camera and illumination unit may grossly represent a captured image of an illumination pattern reflected off two teats positioned at different distances from camera 115 but in a much larger scale. In FIG. 3, the two cylinders were 50 cm tall and were placed at a distance of approximately 70-80 cm from each other. The camera was positioned at an average distance of approximately 1.5 meters from the cylinders. A projector illuminating the cylinders with the illumination pattern was aligned with a line of sight of the camera and positioned 1 meter behind the camera and/or at an average distance of 2.4 meters from the cylinders.

The illumination pattern was selected to be dense enough so that boundaries and dimensions of the teats on the image plane can be identified from the reflected illumination pattern. As can be seen in image 200, the general boundaries and dimension of each of cylinder 220 and 230 on the image plane can be deciphered from the illumination pattern. Typically, an image 200 includes distortions such as barrel distortion that can be corrected for prior to analysis. According to some embodiments of the present invention, 2D coordinates of illumination spots reflected off the teats is determined and used to determine 2D information regarding positioning, orientation and shape of the teats and pattern size is used to determine information in the third dimension perpendicular to the image plane. Typically, actual dimensions of the teat can be determined once the distance between the camera and the teats is known and/or estimated.

The present inventor has found that by selecting a camera FOV that is larger than an angle of illumination of the illuminating unit and by positioning the camera at a distance from the illumination unit and closer to the illuminated surface, a pattern reflected off a surface that is far from the camera can be made to appear smaller than a pattern reflected off a surface that is close to the camera. This feature is described in more detail herein below in reference to FIG. 4.

As can be seen in image 200, the illumination pattern 221 captured from cylinder 220 which is positioned closer to the camera is clearly larger than pattern 231 of cylinder 230 which is more distanced from the camera. Optionally, the size of the pattern, e.g. pattern 221 and 231 can be defined by one or more parameters including spacing between contiguous spots, spot size and spot intensity. According to some embodiments of the present invention, one or more parameters related to a size of the pattern captured in the image is analyzed and used to determine the pattern's distance from the camera, e.g. a distance between imaged spots and the camera. According to some embodiments, based on the determined distances, 3D coordinates of the illumination spots in space, e.g. global coordinates are determined and used to build a 3D model of the teats.

Figure 4:
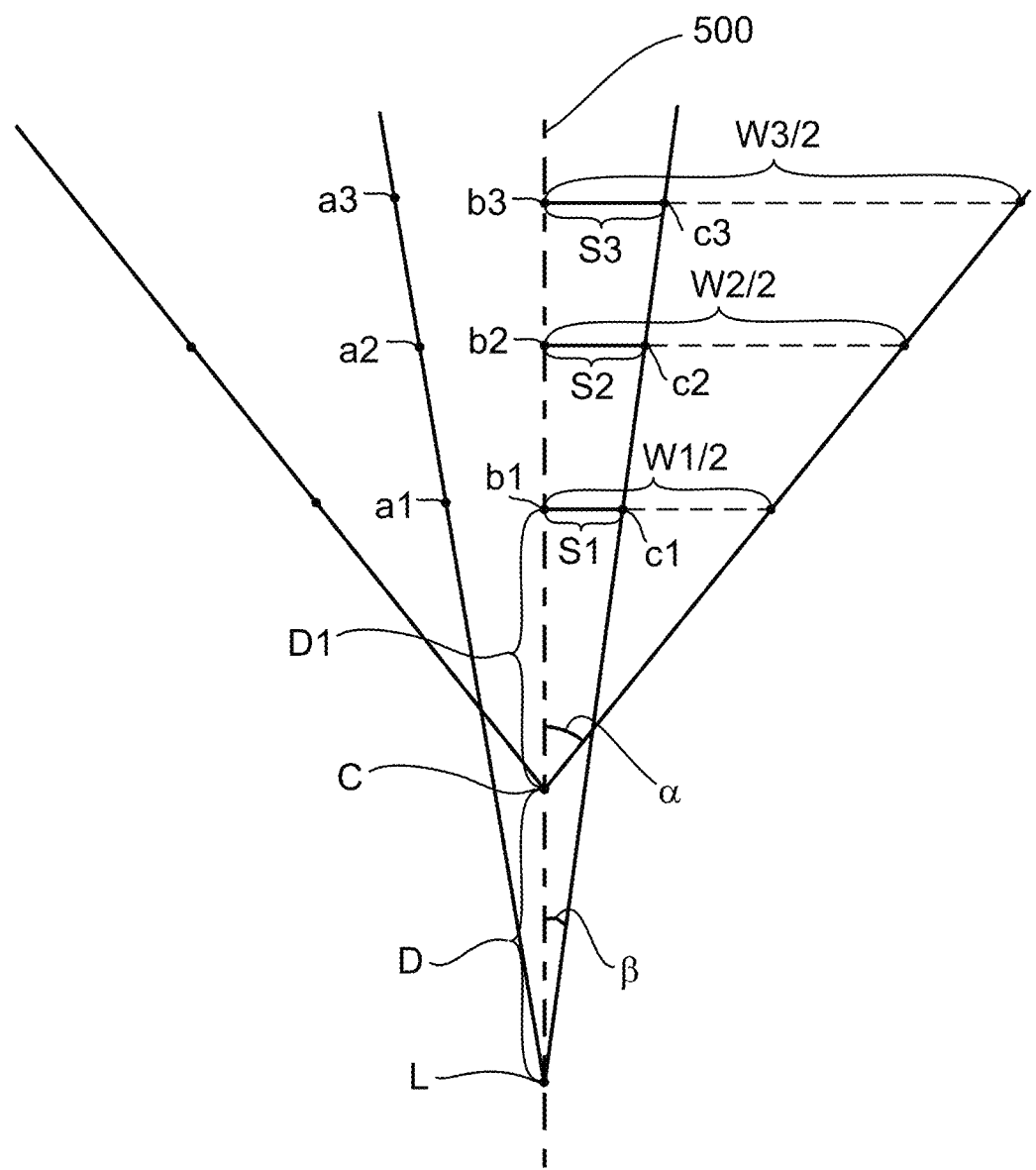
FIG. 4 is a simplified schematic diagram of exemplary geometric relationships of spacing between illumination spots projected on a reflecting surface and spacing between the illumination spots as captured in an image in accordance with some embodiments of the present invention.

Reference is now made to FIG. 4 showing a simplified schematic diagram of exemplary geometric relationships of spacing between illumination spots projected on a reflecting surface and spacing between the illumination spots as captured in an image in accordance with some embodiments of the present invention. In the simplified schematic diagram shown in FIG. 4, a light source 'L' projects a symmetrical array of three spots {a,b,c} over an illumination angle $2*\beta$, where angle $\beta$ represents an angular distance between two contiguous projected spots {b,c}. Due to the angular distribution of the projected spots, a length of an imaginary line S, drawn between a pair of contiguous spots projected on a reflecting surface increases linearly as the distance between illumination unit 'L' and a reflecting surface increases, e.g. line S3 drawn between spots b3 and c3 is longer than line S2 between spots b2 and c2 which is longer than line S1 between spots b1 and c1. This linear relationship exists when line S is perpendicular to a line of sight 500 of camera 'C' and illumination unit 'L'. Typically, lines S1, S2 and S3 are measured between center points of the spots. Typically, a distance between each of lines S1, S2 and S3 and the illumination unit can be determined based a measured distance between spots {a, b} and a known angular distribution of the spots.

According to some embodiments of the present invention, a camera 'C' is axially aligned with an illumination unit 'L' and displaced by distance D from the illumination unit. Alternatively, camera 'C' is positioned off center with respect to illumination unit 'L.' Spacing between contiguous spots in a captured image depends on the illumination properties as well as properties of the camera, e.g. distance of the reflected spots from the camera and the camera's FOV. Typically, as the reflecting surface is distanced from camera 'C' the linear extent of FOV of camera 'C', e.g. W1, W2, W3 linearly increases. It noted that only ½ of the FOV is marked on FIG. 4 for clarity, e.g. W1/2, W2/2, W3/2. According to some embodiments of the present invention, an angular FOV of camera 'C,' e.g. $2*\alpha$ is selected to be larger than the illumination angle, e.g. $2*\beta$ so that the linear extent of the FOV, W increases as a reflecting surface is distanced from camera 'C' at a faster rate than line S between projected spots increases, e.g. lines S1, S2, and S3.

Typically, spacing between spots measured on a captured image is relative to the FOV of the camera, e.g. linear extent W and what is measured on the captured image is proportional to S/W, e.g. S1/W1, S2/W2, S3/W3. Typically, a ratio S1/W1, S2/W2, S3/W3 can be measure on a captured image and represents the length of line S drawn between two spots over the extent of FOV of the camera at that distance.

In some exemplary embodiments, when the camera is positioned between the illumination unit and the region of interest at a distance from the illumination unit, the spacing between spots measured on a captured image, e.g. the ratio S/W decreases as a distance of the reflecting surfaces from the camera increases, since W increases at a faster rate than S. Optionally, the angular FOV of the camera is selected to be larger than an angle of illumination the illumination unit.

According to some embodiments of the present invention and based on the relationships shown in FIG. 4 a distance D1 between a camera 'C' and a pair of contiguous spots, e.g. a line formed by connecting two contiguous spots, can be determined from the following relationship:

$$D1 = \frac{D}{\frac{S1}{W1} \times \frac{\tan(\alpha)}{\tan(\beta)} - 1} \qquad \text{Equation (1)}$$

Where the relationship S1/W1 can be determined from the captured image, D is a known distance between the illumination unit 'L' and camera 'C', $\tan(\alpha)$ can be computed from the known angular FOV of camera 'C' and $\tan(\beta)$ can be computed from the known angular distance between spots projected by illumination unit 'L.' It is noted that distance D1 can be determined from Equation (1) only when the line formed by connecting two contiguous spots, e.g. S1 is perpendicular to the line of sight of camera 'C' and illumination unit 'L' for Equation (1) to be true.

According to some embodiments of the present invention, pairs of contiguous spots defining a line that is perpendicular to the line of sight of camera 115 are identified and Equation (1) is used to determine their distances from camera 115. Typically, the distance determined from Equation (1) for the pair of spots is associated with each spot, e.g. both spots of the pair are defined to be at a same distance from camera 115.

According to some embodiments of the present invention, distances between the camera and the teat is determined for a plurality of pairs of spots along the surface of the teat and used to determine 3D information at those spots. In some exemplary embodiments, the relationship described in Equation (1) is used to determine distances between the camera and pairs of contiguous spots that define lines that cross a central axis of the illumination pattern reflected from the teat.

Optionally, a relationship similar to Equation (1) relating measured spacing between contiguous spots to distance of the spots to the camera is defined from empirical data and used to define 3D positioning of the spots.

According to some embodiments of the present invention, once a distance 'D1' is determined, an actual distance between spots b1 and c1, e.g. length of line S1 can be determined from the following equation:

$$S1=(D1+D)*\tan(\beta) \qquad \text{Equation (2)}$$

According to some embodiments of the present invention, S1 represents actual distance between contiguous spots projected on a surface at distance D1 from the camera and is used to transform 2D coordinates of spots in the image to actual 2D coordinates in space, e.g. global coordinates from which dimensions of the teat can be determined. Typically, once actual distance between spots as projected on a teat is determined, the dimensions of the teat covered by the spots can also be determined.

Figure 5:
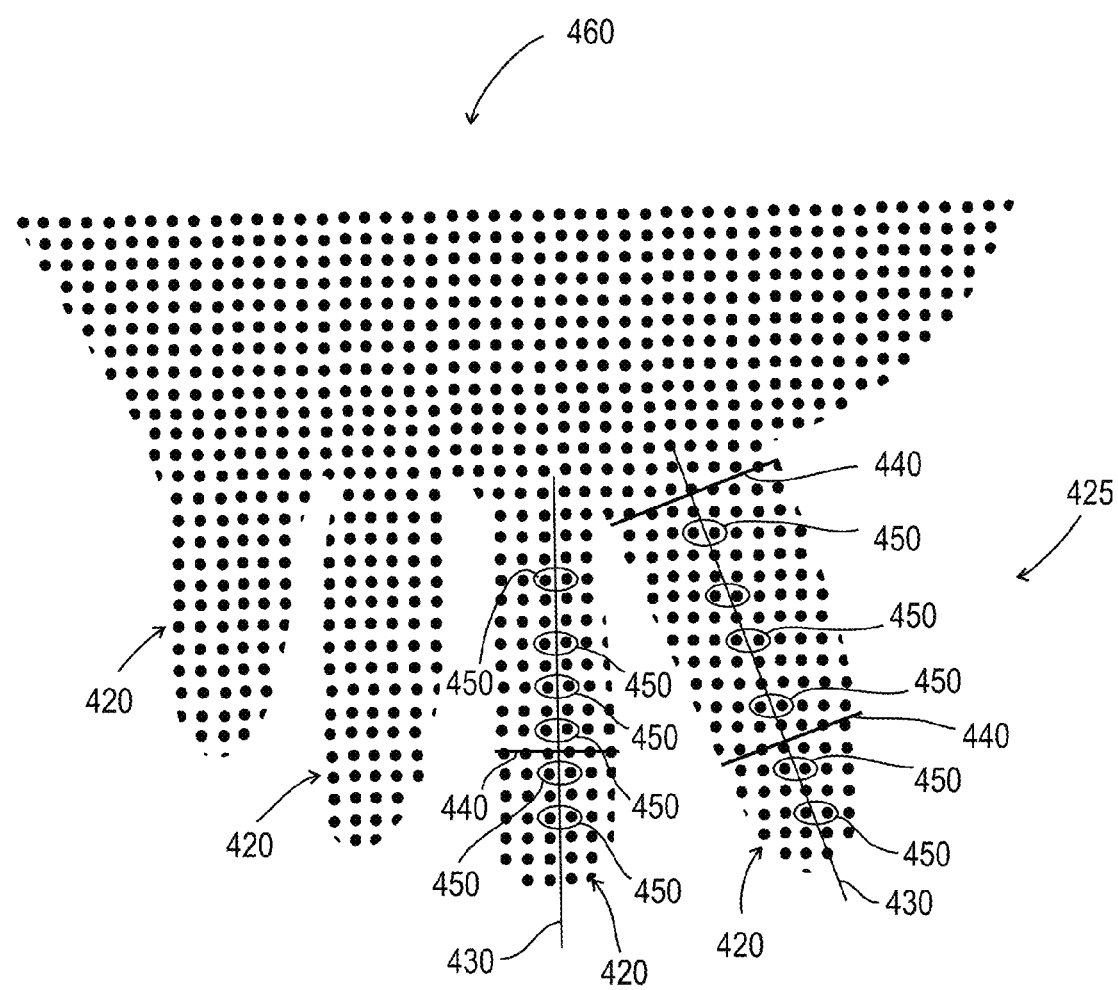
FIG. 5 is a simplified schematic diagram of an exemplary illumination pattern of spots reflected from teats of a dairy animal and selected pairs of spots in the pattern from which distance to the camera is determined in accordance with some embodiments of the present invention.

Reference is now made to FIG. 5 showing a simplified schematic diagram of an exemplary illumination pattern of spots reflected from teats of a dairy animal and selected pairs of spots in the pattern from which distance to the camera is determined in accordance with some embodiments of the present invention. It is noted that although the pattern in FIG. 5 is shown as symmetrical for simplicity sake, the 3D structure of the udder and teats typically distort the symmetry of the illuminated pattern as described herein.

According to some embodiments of the present invention, distances between teat surface and camera is measured at a plurality of points along and/or near a central axis 430 of the illumination pattern reflected from the teat. The present inventors have found that due to the cylindrical structure of the teat, a line 450 (an imaginary line) connecting a pair of contiguous spots that cross central axis 430 can be assumed to be generally perpendicular to the line of sight of the teat modeling device.

According to some embodiments of the present invention, a central axis 430 of the illumination pattern reflected from the teat is computed and/or estimated for each teat area identified. For simplicity, exemplary central axes are only shown on two of the four teats. In some exemplary embodiments, central axis 430 is define based on the size and orientation of each teat in the 2D image plane as determined from the distribution of the illumination spots reflected off each teat. Typically, central axis 430 is defined to divide each teat into substantially two symmetrical portions. In some exemplary embodiments, intensity of the illumination spots is used to define central axis 430. Typically, due to the cylindrical structure of the teats and positioning of the teat modeling unit with respect to the teats, the central axis will typically correspond to the portion of the teat that is closest to the camera and illumination unit and therefore the illumination spots along the central axis will typically be the brightest spots of the imaged pattern.

According to some embodiments of the present invention, distances between camera 115 and each line 405 is determined. Typically, this information together with coordinates of the spots determined from positioning of the spots on the image plane is used to define 3D location, size and orientation of each teat.

In some exemplary embodiment, the 3D model of the teat is completed by estimating diameter 440 of the teat by the extent of the reflected illumination pattern in a direction perpendicular to the computed central axis 430 and using the diameter information to build a cylindrical model of the teats in 3D. Typically, an extent of diameter 440 as determined from the captured images is transformed to actual dimension of the teat based on information regarding distance of the teat from the camera and relationship of Equation (2). Optionally, one or more parameters such as intensity, spot size, and spacing between spots is compared to properties of the spots along central axis and relative distance from those spots to the camera is determined based on the comparison.

Figure 6:
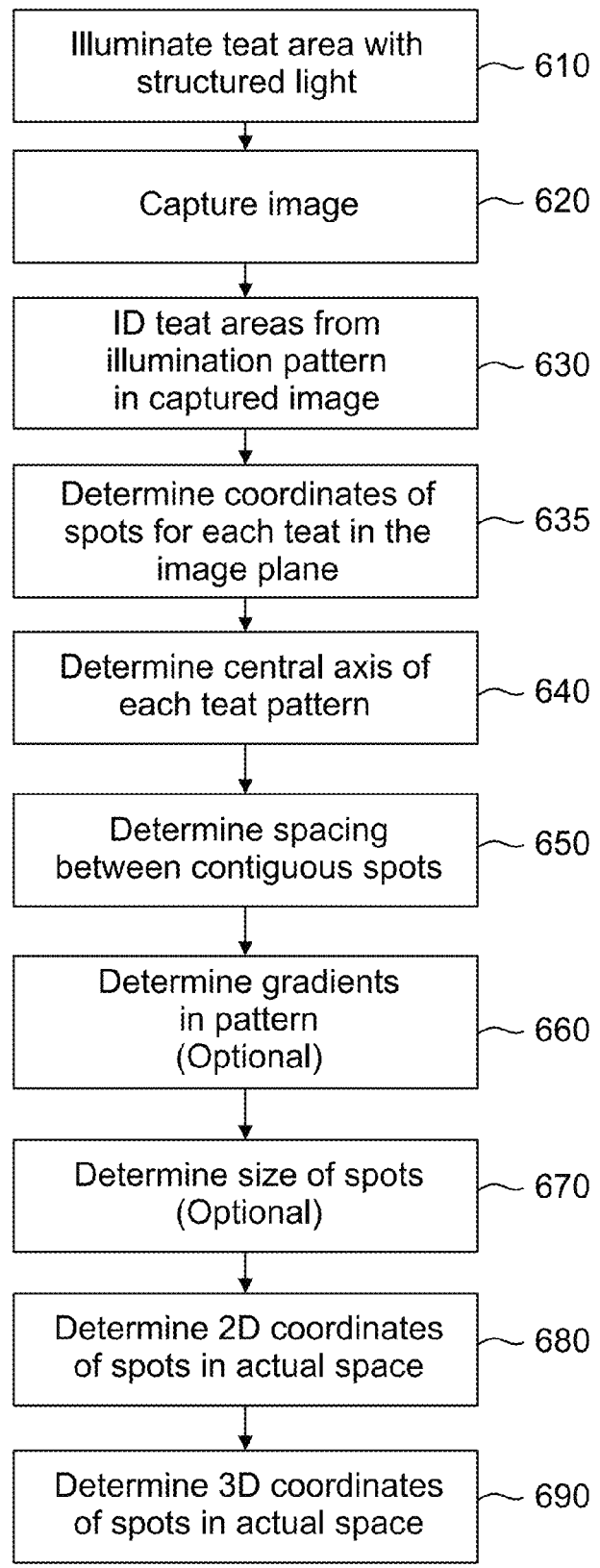
FIG. 6 is a simplified flow chart of an exemplary method for determining 3D position of spots projected on teats of a dairy animal in accordance with some embodiments of the present invention.

Reference is now made to FIG. 6 showing a simplified flow chart of an exemplary method for determining 3D coordinates of spots projected on teats of a dairy animal in accordance with some embodiments of the present invention. According to some embodiments of the present invention, a teat modeling device illuminates teats of a dairy animal with structured light (block 610) and captures images of the illumination reflected off the teats (block 620). Typically, image preprocessing is performed to remove distortions due to optics such as barrel distortion. In some exemplary embodiments, the captured illumination pattern is analyzed to identify areas on the image corresponding to each of the teats illuminated (block 630). Analysis performed for identifying each teat area is described in more detail herein below in reference to FIG. 7.

According to some embodiments of the present invention, 2D coordinates of illumination spots in each teat area on the captured image is determined (block 635). Optionally, coordinates of only a selected portion of the illumination spots in each teat area is determined. Optionally, a boundary of each teat area is determined from the illumination pattern.

According to some embodiments of the present invention, in order to obtain information regarding position of the teats in 3D, a cylindrical shape for the teats is assumed. According to some embodiments of the present invention, a central axis extending along the length of the assumed cylindrical shaped teat is defined (block 640).

According to some embodiments of the present invention, spacing between pairs of contiguous spots is determined (block 650) and used to define positioning of those spots along the axis perpendicular to the imaging plane, e.g. using Equation (1). In some exemplary embodiments, positioning of pairs of contiguous spots in the axis perpendicular to the imaging plane based on spacing is specifically determined for spots positioned along and/or near the identified central axis where the surface area of the teats is assumed to be perpendicular to the line of sight of the teat modeling device.

According to some embodiments of the present invention, gradients in the illumination pattern extending away from the determined central axis are analyzed (block 660) and used to determine relative positioning of those spots with respect to the spots proximal to the central axis. Optionally, spot size (block 670) is analyzed to determined information regarding location of the spots in a plane perpendicular to the imaging plane.

According to some embodiments of the present invention, determined location of the spots in a plane perpendicular to the imaging plane is used to transform 2D coordinates of illumination spots in the image to 2D coordinates in real space, e.g. using Equation (2) (block 680). According to some embodiments of the present invention, 3D coordinates of the illumination spots is determined and used to build a 3D model of the teats (block 690).

Figure 7:
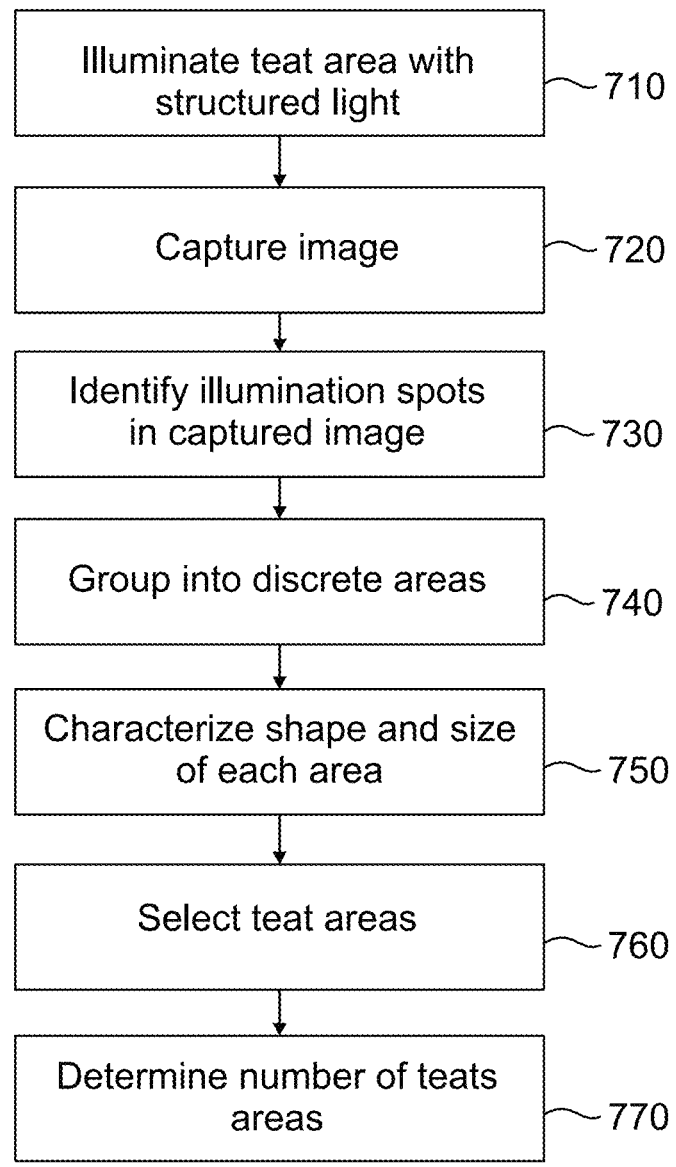
FIG. 7 is a simplified flow chart of an exemplary method for identifying teat areas in an image of an illumination pattern reflected off teats of a dairy animal in accordance with some embodiments of the present invention.

Reference is now made to FIG. 7 showing a simplified flow chart of an exemplary method for identifying teat areas in an image of an illumination pattern reflected off teats of a dairy animal in accordance with some embodiments of the present invention. According to some embodiments of the present, a teat modeling device illuminates a teat area with structured light (block 710) and captures images of the illuminated teat area (block 720). According to some embodiments of the present invention, captured images are analyzed to identify illumination spots derived from the structured light (block 730). Optionally, filtering is used to remove background noise due to ambient lighting conditions. Typically, pre-processing is performed to correct for barrel distortion. According to some embodiments of the present invention, segmentation and/or group analysis is performed to identify discrete groups of illumination spots reflected off different structures, e.g. different teats, the udder, a leg of the dairy animal, a tail of the dairy animal and/or an obstructing object (block 740). In some exemplary embodiments, grouping is based on proximity between illumination spots, size of the illumination spot, and/or pattern formed by the illumination spots. According to some embodiments of the present invention, for each group defined, a shape and/or size of the area covered by the group is determined (block 750). Optionally, a boundary defined by the group is defined and size and/or shape are determined based on the defined boundary. Optionally, size and/or intensity of spots in the group is determined.

According to some embodiments of the present invention, a teat area is defined as an area having a generally cylindrical shape with dimensions within a pre-defined range. According to some embodiments of the present invention, each identified group meeting the criteria for teat area is identified (block 760) and the number of teats positively identified is determined (block 770). Optionally grouping includes separating a potential teat area from a potential udder area. Optionally teat areas are identified as areas extending from an identified udder.

Figure 8:
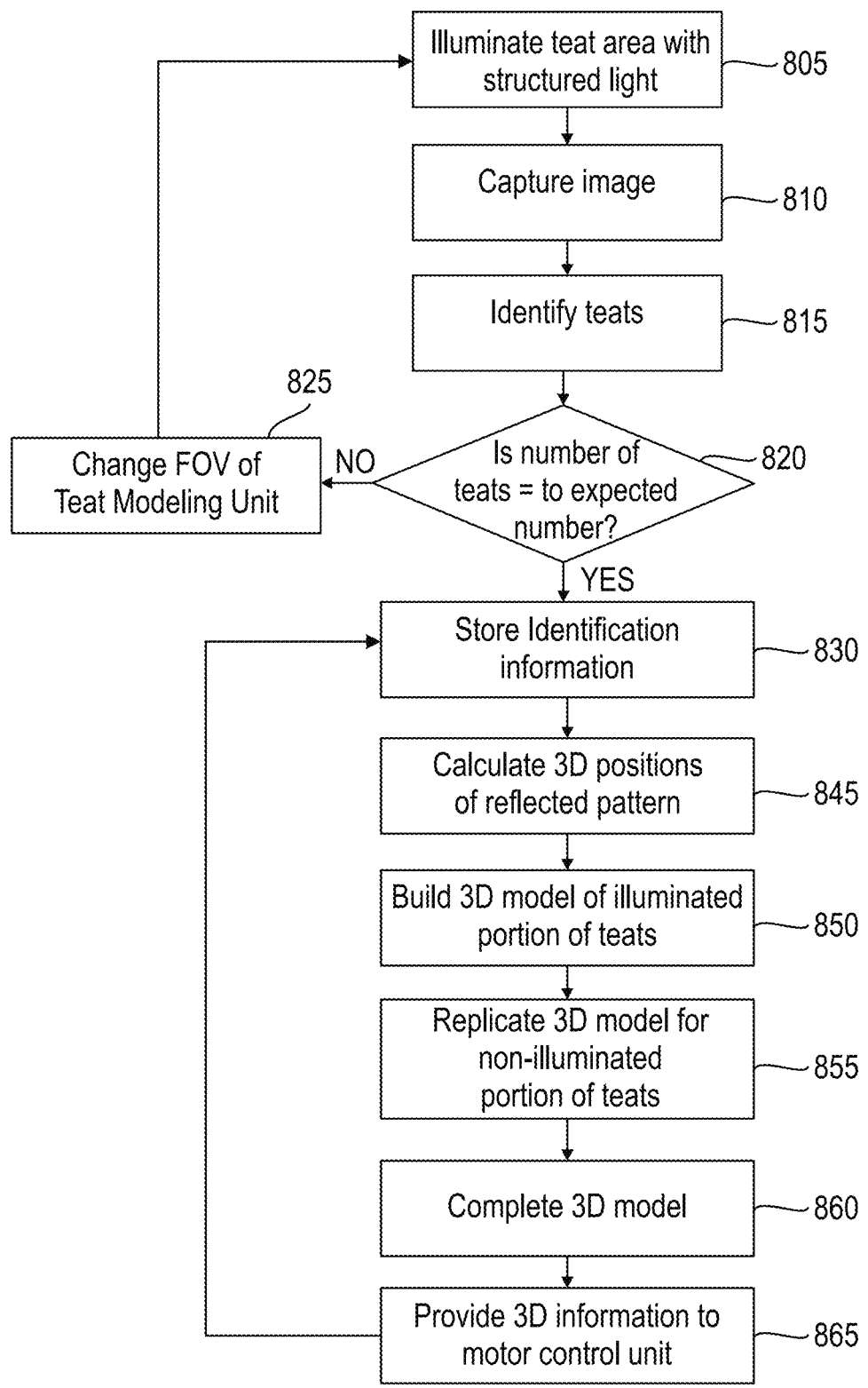
FIG. 8 is a simplified flow chart of an exemplary method for modeling teats in 3D in accordance with some embodiments of the present invention.

Reference is now made to FIG. 8 showing a simplified flow chart of an exemplary method for modeling teats in 3D in accordance with some embodiments of the present invention. According to some embodiments of the present invention, a teat modeling device illuminates a teat area with structured light (block 805) and captures images of the illuminated teat area (block 810). According to some embodiments of the present invention, image data is analyzed to identify possible areas in the image corresponding to teat areas (block 815). In some exemplary embodiments, the number of areas identified is checked against a pre-defined range (block 820). Optionally, a pre-defined range for cows may be between 4-6 teats. Although, cows typically have four teats and most milking machines are designed with four teat cups, some cows may have one or more extra teats. Occasionally in such cases, one or more of the extra teats are dwarfed (and/or have an irregularly structure) and may not be suitable for milking. Optionally, when the teat modeling device identifies more than a standard number of teats, e.g. more than four teats, a selection process is performed to identify the teats that are most suitable for milking. In some exemplary embodiments, if the number of teats identified is outside the pre-defined range, a FOV of the teat modeling device is altered (block 825) and the identification procedure is repeated (blocks 805-815). Optionally, the FOV can be altered by changing tilting the camera and/or by moving the camera to another position. Optionally, if the identification process is unsuccessful, e.g.

after a plurality of attempts, an alert signal or message is sounded and/or transmitted to a human control station.

According to some embodiments of the present invention, in response to successful identification, information regarding identification of the teats is stored and used for modeling (block 830). Although the dairy animal is expected to move during the course of milking and/or attaching of the teats, typically the movement of the cow is limited due to the dimensions of the stall. Stored information regarding general positioning, size and shape of the teat areas determined from the identification phase, may optionally be used to speed up modeling in subsequently captured frames.

According to some embodiments of the present invention, 3D modeling of the teats is performed on a same image from which the teats were successfully identified. In some exemplary embodiments, modeling of the teats is a stateless process and does not require any information from previous images. Optionally, each 3D model is based more than one captured image, e.g. a plurality of images captured in sequence. Optionally, stored identification parameters are updated for subsequent frames.

According to some embodiments of the present invention, once the teat areas are identified, 3D positions of a plurality of spots in each teat area are determined using methods described herein above (block 845). According to some embodiments of the present invention, a 3D model of the illuminated portion of the teats is defined based on the 3D positions of the spots for each teat (block 850). According to some embodiments of the present invention, the surface of the teat opposite that of the illuminated portion is assumed to be identical to the illuminated portion and modeled as a replica of the illuminated portion of the image (block 855). The two halves are then combined to complete the 3D model of the teats (block 860). Typically, the 3D information determined is communicated to a motion control unit of the robotic system to control movement of robotic arms of the system and/or to control operation of the milking machine. According to some embodiments of the present invention, modeling of the teats is repeated at frequency between 5-30 Hz, e.g. 10 Hz.

Figure 9:
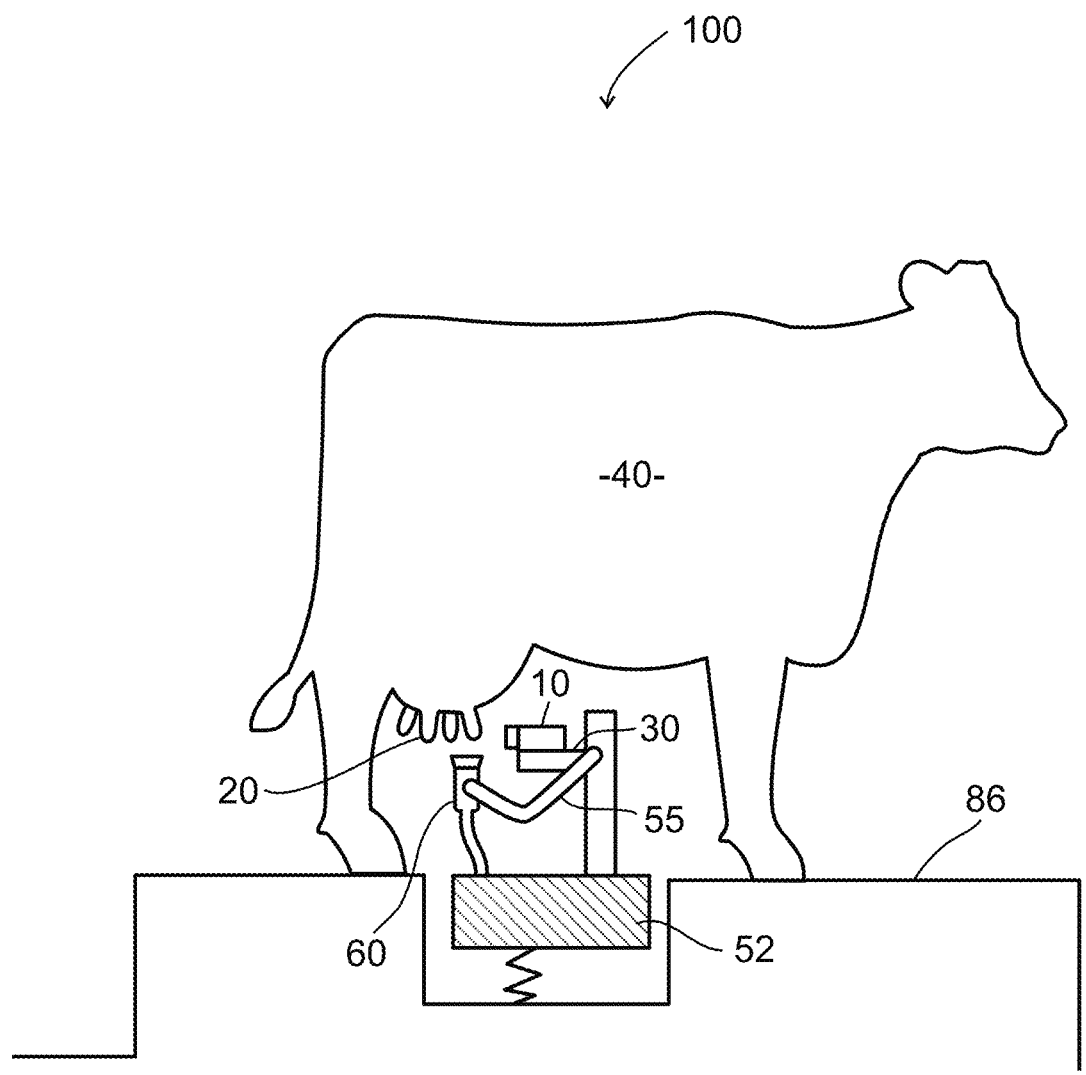
FIG. 9 is a simplified schematic drawing of an exemplary robotic milking system including a teat modeling device in accordance with some embodiments of the present invention.

Reference is now made to FIG. 9 showing a simplified schematic drawing of an exemplary robotic milking system including a teat modeling device in accordance with some embodiments of the present invention. According to some embodiments of the present invention, a robotic milking system 100 includes a teat modeling device 10 for identifying positioning and structure of teats 20 of a dairy animal 40, milking equipment such as a milking cluster 60 for extracting milk, a robotic platform 52 and/or one or more robotic arms and/or extensions 55 for manipulating positioning of the milking equipment with respect to the teats for milking and for performing cleaning, pre-milking, post-milking, and disinfecting procedures, and a motion control unit 30 for directing movement of robotic platform and arms.

In some exemplary embodiments, milking cluster 60 is supported by robotic platform 52 that can be moved in 3 axes (x, y, z) and each teat cup of the cluster is manipulated by robotic arm 55 for attaching the teat cup to the teats. In some exemplary embodiments robotic arm 55 is used to perform pre-milking routines such as massaging the teats, dipping the teats in iodine and washing and drying the teats. Similarly, robotic arm 55 may also perform post-milking routines such as post dipping, washing and drying of the teat. Optionally, robotic system 100 includes additional robotic extensions for performing the pre-milking and post-milking routines. In some exemplary embodiments, robotic system 100 is stored, e.g. in a collapsed stated below platform 86 on which dairy animal 40 stands so that it does not obstruct entry and exit of the dairy animal to and from the milking station and is raised and expanded once a cow is positioned in the stall. Typically, the stall is equipped with a sensor for sensing entry of dairy animal 40 into a milking station and prompting operation of robotic system 100. Optionally, a heard management system in communication with robotic milking system 100 provides information regarding entry of a cow to a milking stall.

According to some embodiments of the present invention, teat modeling device 10 is mounted on robotic platform 52 and is operable to sense position, orientation and structure of teats 20 in 3D during operation of robotic system 100. According to some embodiments of the present invention, sensing is based on image data captured by teat modeling device 10 as described herein above. Typically, output from teat modeling device 10 is used as input to motion control unit 30 for controlling movement of robotic platform 52 and robotic arms 55 toward and away from the teats and for operating the milking equipment. The sensed position and orientation may be absolute positioning in 3D of each teat and/or relative positioning of each teat with respect to a robotic arm and/or a device of the milking equipment, e.g. teat cup of milking cluster 60 that is also captured in the image. Optionally, a light source is mounted on one or more robotic arms and/or teat cups and illuminates during operation. Optionally, robotic arms include an illuminator that provides illumination with a predefined pattern. Optionally, robotic arms include a reflecting surface having a pre-defined pattern. In some exemplary embodiments, teat modeling device is additionally operable to identify position of the light source, e.g. absolute position and/or relative to teats.

In some exemplary embodiments, teat modeling device 10 is manipulated by a robotic arm mounted on platform 52 for altering a FOV of teat modeling device 10. Movement of the robotic arm may be controlled by motion control unit 30 based on input from teat modeling device 10 and/or may be self controlled, e.g. controlled by a local motion control unit of teat modeling device 10. In some exemplary embodiments, teat modeling device 10 is operable to search for a FOV that provides adequate viewing of all the teats of dairy animal 40 and/or of a region of interest. In some exemplary embodiments, teat modeling device 10 is operable to communicate with one or more remote systems, to transmit information to a display device and/or to store information in a memory unit associated with robotic system 100. Optionally, teat modeling device 10 intermittently receives and/or request input from a human operator that is used to correct and/or improve modeling of the teats.

Figure 10A:
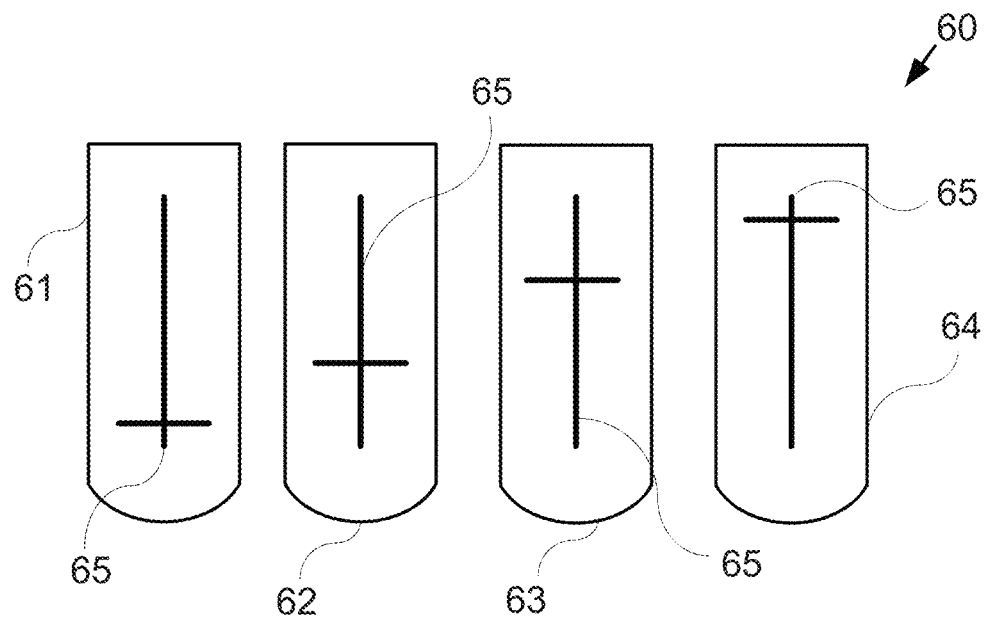
FIGS. 10A and 10B are simplified schematic drawings of teat cups including exemplary coded patterns that are optionally identified by a teat modeling device in accordance with some embodiments of the present invention.
Figure 10B:
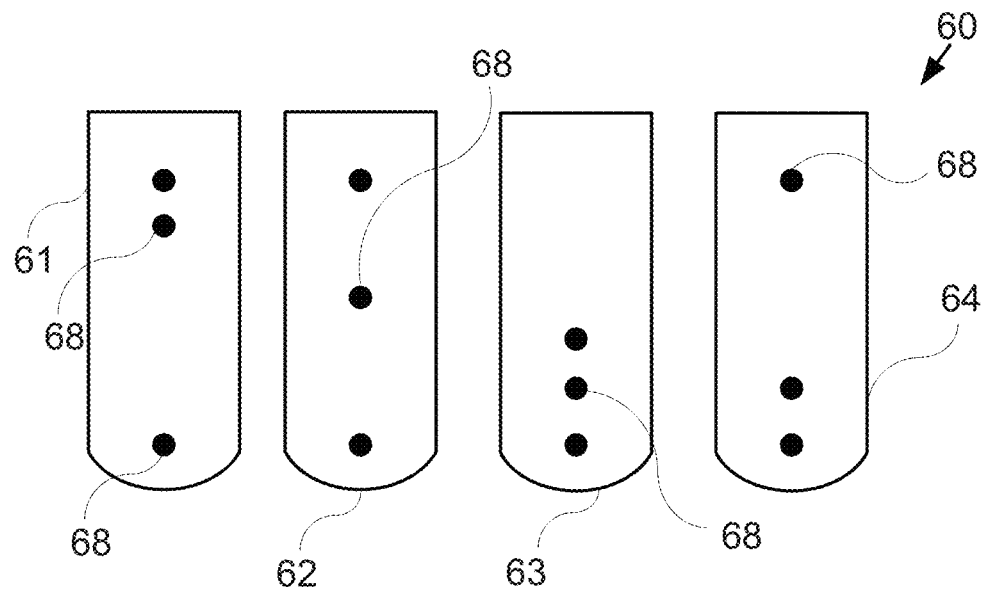

Reference is now made to FIGS. 10A and 10B showing simplified schematic drawings of teat cups including exemplary coded patterns that are optionally identified by a teat modeling device in accordance with some embodiments of the present invention. According to some embodiments of the present invention, a milking cluster 60 includes teat cups 61, 62, 63 and 64 that are patterned with a reflector 65 and/or one more LEDs 68. Optionally, LEDs 68 project light with a pre-defined shape, e.g. rectangular, oval or circular shape. Optionally, each of teat cups 61, 62, 63 and 64 are patterned with a unique pattern, e.g. encoded pattern that can be differentiated from patterns of one or more other teat cups so that individual teat cup can be identified and tracked. In some exemplary embodiments, teat modeling device is additionally operable to identify track position and identify each of teat cups 61, 62, 63 and 64. Optionally, a relative position and/or orientation between a teat and one or more teat cups 61, 62, 63 and 64 is tracked and/or determined. In some exemplary embodiments, a pattern formed by the reflector or LEDs extends along a length of the teat cup, e.g. the pattern is an oblong pattern. Optionally, the oblong pattern provides for tracking an orientation of the teat cup, e.g. an angle of the teat cup.

It is noted that although most of the embodiments of the present invention have been described in reference to modeling all the teats of a dairy animal from a captured images, in some exemplary embodiments, modeling may be performed on only one teat and/or less than all the teats of the cow using the systems and methods described herein.

It is appreciated that although the present invention has been described in reference to 3D modeling of teats of a dairy animal, similar systems and methods can be applied for 3D modeling (and locating) of other objects having a predefined shape, e.g. cylindrical or other shape.

It is expected that during the life of a patent maturing from this application many relevant image units and illumination units will be developed providing an expanded FOV and/or angle of illumination. The scope of the term imaging unit and illumination unit is intended to include all such technologies a priori.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for three dimensional modeling of teats of a dairy animal, the method comprising:
    illuminating at least one teat of a dairy animal with a structured light pattern;
    capturing an image of the structured light pattern reflected from the at least one teat;
    determining positioning of the reflected pattern on the image;
    determining spacing between elements of the reflected pattern; and
    computing a three dimensional model of the at least one teat based on the determined positioning and the determined spacing, wherein a shape of the three dimensional model is pre-defined.

2. The method according to claim 1, wherein the pre-defined shape of the at least one teat is a cylindrical shape.

3. The method according to claim 1, wherein the at least one teat is illuminated with a matrix pattern formed from a plurality of illumination spots and wherein the method comprises determining three dimensional coordinates of spots reflected off the at least one teat.

4. The method according to claim 3, wherein a coordinate value along an axis perpendicular to the image plane is computed from the determined spacing between the spots reflected off the at least one teat.

5. The method according to claim 4 comprising identifying a pair of spots defining a line that is parallel to the image plane, and computing a coordinate value along an axis perpendicular to the image plane from determined spacing between pair of spots.

6. The method according to claim 3, comprising determining at least one of intensity and size of the spots reflected off the at least one teat, wherein a coordinate value along an axis perpendicular to the image plane is computed from at least one of the determined intensity and the determined size of the spots.

7. The method according to claim 1, wherein the three dimensional model of the at least one teat is computed from a single image.

8. The method according to claim 1, comprising modeling both an illuminated portion of the at least one teat and a portion of the at least one teat opposite the illuminated portion, wherein the portion opposite the illuminated portion is modeled based on an assumption of symmetry between the illuminated portion of the at least one teat and the portion of the at least one teat opposite the illuminated portion.

9. The method according to claim 1, wherein the three dimensional model determines three dimensional orientations of the at least one teat.

10. The method according to claim 1, comprising simultaneously illuminating all the teats of the dairy animal with the structured light, wherein an image of all the teats of the dairy animal is captured in a single image.

11. The method according to claim 10, performing segmentation on the image to identify the structured light pattern reflected off each of the teats.

12. The method of according to claim 10, comprising computing a three dimensional model for all the teats based on the single image.

13. A teat modeling device comprising:
    a housing including:
        an illumination unit operative to project a structured light pattern on at least one teat of a dairy animal; and
        a camera positioned between the illumination unit and the at least one teat of a dairy animal, wherein the camera is operative to capture an image of the structured light pattern reflected off the at least one teat,
    wherein a line of sight of the camera and a line of sight of the illumination unit are defined to be parallel or to coincide with each other;
    a memory unit storing expected shape parameters of the at least one teat based on a pre-defined shape of the at least one teat; and
    a processor operative to compute a three dimensional model of the at least one teat based on the stored parameters, positioning of the reflected pattern on the image and spacing between elements of the reflected pattern.

14. The device according to claim 13, wherein the pre-defined shape is a cylindrical shape.

15. The device according to claim 13, wherein an illumination unit is operative to project dot matrix pattern on the at least one teat of the dairy animal and wherein the processor is operative to determine three dimensional coordinates of elements of the reflected pattern.

16. The device according to claim 13, wherein the processor is operative to defined the three dimensional model of the at least one teat from a single image captured by the camera.

17. The device according to claim 13, wherein the processor is operative to update the three dimensional model at a rate of 2-20 Hz.

18. The device according to claim 13, wherein the illumination unit is operative to simultaneously illuminate all the teats of a dairy animal with the structured light pattern and wherein the camera is operative to capture all the teats of the dairy animal in a single image.

19. The device according to claim 18 wherein the processor is operative to compute a three dimensional model of all the teats captured in the single image.

20. The device according to claim 13, wherein the illumination unit includes an array of LEDs.

21. The device according to claim 13, wherein the illumination unit includes a diffraction grating operative to form the structured light.

22. The device according to claim 13, wherein the illumination unit provides pulsed illumination.

23. The device according to claim 13, wherein the illumination unit includes an image projector.

24. The device according to claim 13, wherein the camera is operative to capture an image of at least one teat cup and wherein the processor is operative to detect a position of the at least one teat cup.

25. The device according to claim 13, an illumination angle of the illumination unit is defined to 35 degrees or less and a field of view of the camera is between 75-120 degrees.

26. The device according to claim 13 wherein a field of view of the camera is at least double an angle of illumination of the illumination unit.

27. A robotic milking system comprising:
a teat modeling device comprising:
   a housing including:
      an illumination unit operative to project a structured light pattern on at least one teat of a dairy animal; and
      a camera positioned between the illumination unit and the at least one teat of a dairy animal, wherein the camera is operative to capture an image of the structured light pattern reflected off the at least one teat,
   wherein a line of sight of the camera and a line of sight of the illumination unit are defined to be parallel or to coincide with each other;
   a memory unit storing expected shape parameters of the at least one teat based on a pre-defined shape of the at least one teat; and
   a processor operative to compute a three dimensional model of the at least one teat based on the stored parameters, positioning of the reflected pattern on the image and spacing between elements of the reflected pattern;
a motion control unit; and
at least one robotic arm for manipulating a milking device,
wherein the motion control unit controls movement of the at least one robotic arm based on input from the teat modeling device.

28. The robotic milking system according to claim 27, wherein the milking device includes at least one teat cup patterned with at least one of a reflector and a LED.

29. The robotic milking system according to claim 28, wherein the teat modeling device is operative to track a position of the at least one teat cup.

30. The robotic milking system according to claim 28, wherein the at least one teat cup moves independently from the teat modeling device.

* * * * *